(12) United States Patent
Newsome et al.

(10) Patent No.: US 11,415,545 B2
(45) Date of Patent: Aug. 16, 2022

(54) GAS SENSOR SYSTEM AND METHOD

(71) Applicant: Sumitomo Chemical Company Limited, Tokyo (JP)

(72) Inventors: Christopher Newsome, St. Ives (GB); Nicholas Dartnell, Eltisley (GB); Simon Goddard, Impington (GB)

(73) Assignee: Sumitomo Chemical Company Limited, Tokyo (JP)

( * ) Notice: Subject to any disclaimer, the term of this patent is extended or adjusted under 35 U.S.C. 154(b) by 135 days.

(21) Appl. No.: 16/603,453

(22) PCT Filed: Mar. 15, 2018

(86) PCT No.: PCT/GB2018/050671
§ 371 (c)(1),
(2) Date: Oct. 7, 2019

(87) PCT Pub. No.: WO2018/185457
PCT Pub. Date: Oct. 11, 2018

(65) Prior Publication Data
US 2020/0041443 A1 Feb. 6, 2020

(30) Foreign Application Priority Data
Apr. 7, 2017 (GB) .................................. 1705676

(51) Int. Cl.
*G01N 27/414* (2006.01)
(52) U.S. Cl.
CPC ............................. *G01N 27/4141* (2013.01)

(58) Field of Classification Search
CPC ............. G01N 27/4141; G01N 27/414; G01N 33/0031; H01L 29/772
See application file for complete search history.

(56) References Cited

U.S. PATENT DOCUMENTS

| 2006/0174683 A1 | 8/2006 | Bonne et al. |
| 2007/0295203 A1* | 12/2007 | Shekarriz ........... G01N 27/4162 95/8 |
| 2008/0210987 A1 | 9/2008 | Bondavalli et al. |
| 2011/0084261 A1* | 4/2011 | Sekiya ................. H01L 51/105 257/40 |

(Continued)

FOREIGN PATENT DOCUMENTS

EP 0168200 A2 1/1986

OTHER PUBLICATIONS

GB 1705676.3, Oct. 9, 2017, UK Combined Search and Examination Report.

(Continued)

*Primary Examiner* — Gurpreet Kaur
(74) *Attorney, Agent, or Firm* — Wolf, Greenfield & Sacks, P.C.

(57) ABSTRACT

A gas sensor system (100) comprising at least one first field effect transistor (200) comprising first source and drain electrodes and at least one second field effect transistor (300) comprising second source and drain electrodes different from the first source and drain electrodes. Different responses of the first and second FETs to gases in an environment may be used to differentiate between the gases, for example to differentiate between 1-methylcyclopropene and ethylene in locations where fruit is stored.

17 Claims, 7 Drawing Sheets

(56) References Cited

U.S. PATENT DOCUMENTS

2011/0169057 A1     7/2011   Tsukada
2017/0219519 A1*   8/2017   Chen .................. G01R 27/02

OTHER PUBLICATIONS

PCT/GB2018/050671, May 28, 2018, International Search Report and Written Opinion.
UK Combined Search and Examination Report for Application No. GB 1705676.3 dated Oct. 9, 2017.
International Search Report and Written Opinion for International Application No. PCT/GB2018/050671 dated May 28, 2018.
Chu et al., High-performance organic thin-film transistors with metal oxide/metal bilayer electrode. Applied Physics Letters. 2005;87(19):193508. 4 pages. DOI: 10.1063/1.2126140.
Esser et al., Selective Detection of Ethylene Gas Using Carbon Nanotube-based Devices: Utility in Determination of Fruit Ripeness. Angewandte Chemie International Edition. 2012;51(23):5752-5756. DOI: 10.1002/anie.201201042.
Nketia-Yawson et al., Highly Sensitive Flexible $NH_3$ Sensors Based on Printed Organic Transistors with Fluorinated Conjugated Polymers. ACS Applied Materials & Interfaces. 2017;9(8):7322-7330. DOI: 10.1021/acsami.6b14220.

\* cited by examiner

GAS SENSOR SYSTEM AND METHOD

RELATED APPLICATIONS

This Application is a national stage filing under 35 U.S.C. § 371 of international PCT application PCT/GB2018/050671, filed Mar. 15, 2018, which claims priority to United Kingdom patent application no. GB 1705676.3, filed Apr. 7, 2017, each of which is incorporated herein by reference in its entirety.

FIELD OF THE INVENTION

The invention relates to gas sensor systems comprising field effect transistors and the use thereof in detection of gases, in particular alkenes.

BACKGROUND OF THE INVENTION

The use of thin film transistors as gas sensors is disclosed in, for example, Feng et al, "Unencapsulated Air-stable Organic Field Effect Transistor by All Solution Processes for Low Power Vapor Sensing" Scientific Reports 6:20671 DOI: 10.1038/srep20671 and Besar et al, "Printable ammonia sensor based on organic field effect transistor", Organic Electronics, Volume 15, Issue 11, November 2014, Pages 3221-3230.

Ethylene produced by plants can accelerate ripening of climateric fruit, the opening of flowers, and the shedding of plant leaves. 1-methylcyclopropene (1-MCP) is known for use in inhibiting such processes.

Chu et al, "High-performance organic thin-film transistors with metal oxide/metalbilayer electrode", Appl. Phys. Lett. 87, 193508, 2005 discloses bilayer source-drain electrodes for organic thin film transistors (OTFTs) consisting of a transition metal oxide selected from $MoO_3$, $WO_3$, or $V_2O_5$ and a metal layer.

It is an object of the invention to provide a gas sensor system capable of distinguishing between different gases, in particular different alkenes.

SUMMARY OF THE INVENTION

The present inventors have surprisingly found that different field-effect transistors containing different source and drain electrodes can be used to differentiate between different gases in an environment.

Accordingly, in a first aspect the invention provides a gas sensor system comprising at least one first field effect transistor comprising first source and drain electrodes and at least one second field effect transistor comprising second source and drain electrodes different from the first source and drain electrodes.

The present inventors have surprisingly found that a field effect transistor having source and drain electrodes comprising a gold layer and an oxide layer gives an irreversible response in the presence of 1-MCP.

Accordingly, the first field effect transistor of the first aspect the invention may comprise a gate electrode; source and drain electrodes; a semiconductor extending between the source and drain electrodes; and a dielectric layer between the gate electrode and the semiconductor, wherein the source and drain electrodes each comprise a gold layer and an oxide layer between the gold layer and the dielectric layer.

In a second aspect the invention provides a method of identifying the presence and/or concentration of at least one target gas in an environment, the method comprising the step of measuring a parameter of each of the first and second field effect transistors of the gas sensor system of the first aspect and determining from the measured parameters if the target gas is present and/or determining a concentration of the target gas.

Preferably, the target gas is an alkene.

In a third aspect the invention provides a method of detecting at least one alkene in an environment, the method comprising the step of measuring a parameter of the field effect transistor exposed to the environment and determining from the measured parameter if the at least one alkene is present, wherein the field effect transistor comprises a gate electrode; source and drain electrodes; a semiconductor extending between the source and drain electrodes; and a dielectric layer between the gate electrode and the semiconductor layer, wherein the source and drain electrodes each comprise a first layer comprising or consisting of gold and a second layer comprising or consisting of an oxide between the first layer and the dielectric layer or between the first layer and the semiconducting layer.

DESCRIPTION OF THE DRAWINGS

The invention will now be described in detail with reference to the Figures in which.

DETAILED DESCRIPTION OF THE INVENTION

Figure 1:
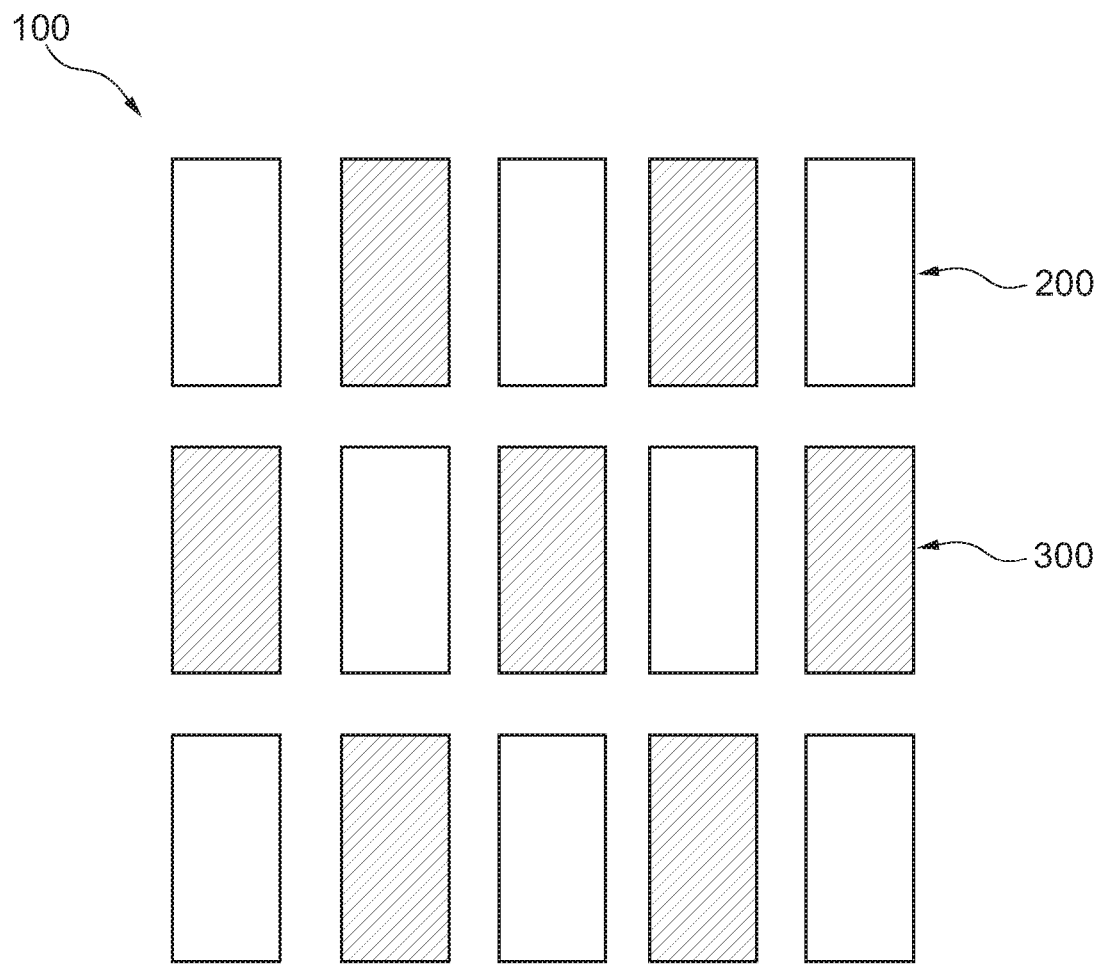
FIG. 1 illustrates a gas sensor system according to an embodiment of the invention.

FIG. 1 is a schematic illustration of a gas sensor system 100 according to an embodiment of the invention. The gas sensor system comprises at least one first field effect transistor 200 and at least one second field effect transistor 300. In the embodiment of FIG. 1, the gas sensor system comprises a plurality of each of the first and second field effect transistors arranged in an array of alternating first and second field effect transistors, however it will be appreciated that the first and second field effect transistors may be provided in different first:second field effect transistor ratios and/or in different configurations relative to one another.

The gas sensor system may comprise one or more of each of a third, a fourth, a fifth or more further FETs, wherein each of the further FETs are different from one another, preferably differing in their source and drain electrodes.

It will be appreciated that the semiconducting layer of each of the first and second field effect transistors and, if present, any of the further FETs, is exposed to a gaseous atmosphere when the gas sensor system is in use to allow the responses of the FETs to the atmosphere to be measured.

The gas sensor system may comprise one or more control FETs not exposed to the gaseous atmosphere, for example by encapsulation of the or each control FET), when the system is in use for calibration of the first, second and any further FETs which are exposed to the gaseous atmosphere when the system is in use.

Each of the first, second and any further field effect transistors of the gas sensor system may be supported on a common substrate and/or contained in a common housing.

In use, each field effect transistor may be connected to a common power source, or two or more of the field effect transistors may be powered by different power sources.

In use, power to all of the transistors of the gas sensor may be controlled by a single switch or power to two or more of the field effect transistors may be controlled by different switches.

The first and second field effect transistors have different respective first and second source and drain electrodes.

Optionally, the first, second and any further source and drain electrodes differ in one or more of:

number of layers of the source and drain and electrodes; and material composition of a layer of the source and drain electrodes Optionally, the first, second and any further source and drain electrodes are each either a single layer or bilayer electrode.

Single layer source and drain electrodes may comprise or consist of a conductive polymer or a metal, preferably a transition metal. Exemplary transition metals are gold and silver.

Preferably, at least one of the first source and drain electrodes and the second source and drain electrodes is a bilayer of a first layer comprising or consisting of a metal and second layer comprising or consisting of an oxide between the first layer and the dielectric layer of the field effect transistor.

Preferably, a layer of the first source and drain electrodes comprises or consists of a material that is not present in the second source and drain electrodes.

Figure 2:
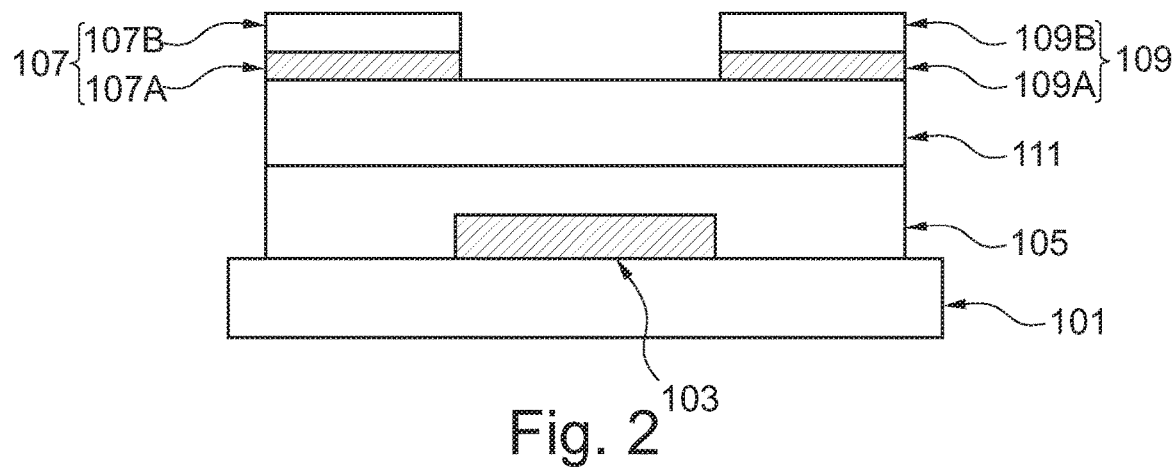
FIG. 2 illustrates a bottom gate, top contact thin film transistor (TFT) for use as a gas sensor according to embodiments of the invention.

FIG. 2 is a schematic illustration of a bottom-gate, top contact TFT suitable for use as a first FET in a gas sensor system according to an embodiment of the invention. The bottom-gate, top contact TFT comprises a gate electrode 103 over a substrate 101; source and drain electrodes 107, 109; and a dielectric layer 105 between the gate electrode and the source and drain electrodes; and a semiconductor layer 111 between the dielectric layer and the source and drain electrodes and extending between the source and drain electrodes. The source and drain electrodes each comprise a gold layer 107B, 109B and an oxide layer 107A, 109A between the gold layer and the dielectric and semiconductor layers. The bottom-gate TFT may be a n-type or p-type device.

The device of FIG. 2 is a top contact device, that is the source and drain electrodes are on the semiconducting layer, the oxide layers being adjacent to the semiconducting layer.

Figure 3:
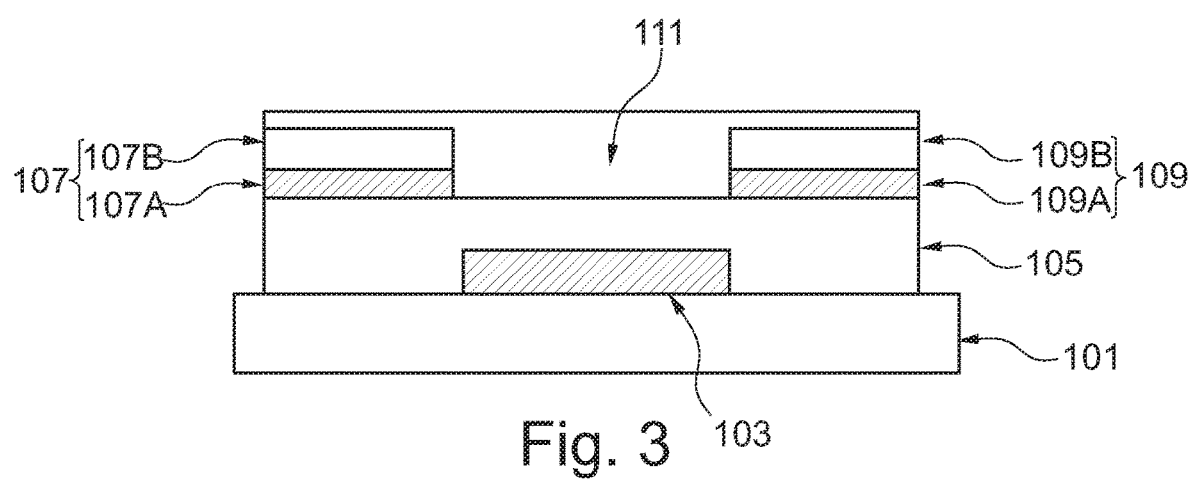
FIG. 3 illustrates a bottom gate, bottom contact thin film transistor (TFT) for use as a gas sensor according to embodiments of the invention.

FIG. 3 is a schematic illustration of a bottom-gate, bottom contact TFT suitable for use as a first FET in a gas sensor system according to an embodiment of the invention in which reference numerals are as described with reference to FIG. 2.

As illustrated in FIG. 3, the dielectric layer may be the only layer between the gate electrode and the source and drain electrodes of the bottom contact TFT whereas at least a dielectric layer and a semiconducting layer is between the gate electrode and the source and drain electrodes of a top contact TFT, for example as illustrated in FIG. 2. Preferably, the source and drain electrodes of the bottom contact TFT are on the dielectric layer.

The bottom-gate TFT may consist of the layers described with reference to FIG. 2 or 3 or it may comprise one or more further layers. Exemplary further layers include, without limitation, a charge-transporting layer for example as described in WO2016/001095; and more than one dielectric layer between the source and drain electrodes and the gate electrode, for example as described in US 2011/127504.

It will be appreciated that the semiconducting layer extending "between" the source and drain electrodes as described herein includes the case where the source and drain electrodes are on the semiconducting layer, for example as illustrated in FIG. 2, and the case where source and drain electrodes are partially or completely covered by the semiconducting layer, for example as illustrated in FIG. 3.

The bottom-gate TFT of FIG. 2 or FIG. 3 may be used as the first field effect transistor of a gas sensor system as described herein, preferably a gas sensor system for sensing an alkene, more preferably ethylene or 1-methylcyclopropene (1-MCP).

The present inventors have found that a field-effect transistor comprising a bilayer of a first layer comprising or consisting of gold and a second layer comprising or consisting of an oxide gives an irreversible response in the presence of 1-MCP but a reversible response in the presence of ethylene.

By "irreversible response" as used herein is meant that the drain current of the device changes upon exposure to 1-MCP and the change is reversed by less than 50% upon exposure of the device to a dry nitrogen environment at 25C and 1 atmosphere pressure.

The present inventors have further found that the drain current relative to a baseline value of a transistor comprising a bilayer of a first layer comprising or consisting of gold and a second layer comprising or consisting of an oxide may upon exposure to 1-MCP fall faster and/or may fall by more than a fall in drain current upon exposure of the transistor to ethylene.

When a field effect transistor is having source and drain electrodes comprising a first layer comprising or consisting of gold and a second layer comprising or consisting of an oxide as described herein is used as a first field effect transistor of a gas sensor system, the second source and drain electrodes of the second field effect transistor are optionally selected from: a single metal layer and a bilayer comprising a first layer comprising a conductive polymer or a metal other than gold and a second layer comprising an oxide between the first layer and the dielectric layer.

Metals other than gold are preferably transition metals, for example silver. The oxide of a second layer of the second source and drain electrodes may be selected from oxides as described herein with reference to the second layer of the first source and drain electrodes.

The second field effect transistor may be a bottom-gate transistor as described with reference to FIGS. 2 and 3 with different source and drain electrodes as described herein.

The response of the first and second FETs and, if present, any further FETs of the gas sensor system to the gas or gases to be detected may be measured prior to use of the gas sensor system in an environment containing the gas or gases. The measured response may be used to avoid a response to a target gas being confused with a response to another gas in the environment in which the gas sensor system is used.

The gas sensor may be used in a controlled environment in which a gas which gives the same or similar response to a target gas is not present.

The response of the first and second FETs of the gas sensor system to background gases other than the target gases for detection, for example air or water vapour, may be measured prior to use to allow subtraction of the background from measurements of the gas sensor system when in use.

In use, the gas sensor system of the first aspect may be placed in an environment in which alkenes may be present, for example a warehouse in which harvested climateric fruits or cut flowers are stored and in which ethene may be generated.

In an environment in which ethylene may be present, the presence and/or concentration of ethylene may be determined using the gas sensor system. If ethylene concentration is above a threshold value, which may be 0 or a positive threshold value, then 1-MCP may be released from a 1-MCP source to retard the effect of the ethylene, such as ripening of fruit or opening of flowers in the environment.

Optionally, 1-MCP may be released into the atmosphere if 1-MCP concentration falls below a threshold value as determined by the gas sensor system. The threshold value may be 0 or a positive value.

Optionally, if the change and/or the rate of change of the drain current of a transistor according to the present invention exceeds a threshold value then it may be determined that 1-MCP is present in the environment.

Optionally, if the change and/or the rate of change of the drain current of a transistor reaches a threshold value indicating the presence of ethylene but without reaching a threshold value indicative of the presence of a predetermined minimum concentration of 1-MCP then it may be determined that ethylene is present but 1-MCP is not present in the atmosphere at the predetermined minimum concentration.

In one embodiment, different responses of the first and second transistors to 1-MCP and ethylene, such as an irreversible response by the first FET and a reversible response by the second FET, may be used to differentiate between these gases in an environment containing both gases, for example following release of 1-MCP into an environment upon detection of ethylene.

1-MCP may be released automatically from a 1-MCP source or an alert or instruction may be generated to manually release 1-MCP from a 1-MCP source in response to signal from the gas sensor system upon determination that 1-MCP concentration is below a threshold that is a positive value and/or in response to a determination that ethylene concentration exceeds a threshold which may be 0 or a positive value.

The gas sensor may be in wired or wireless communication with a controller which controls automatic release of 1-MCP from a 1-MCP source.

An environment in which an alkene may be present may be divided into a plurality of regions if the concentration of an alkene or alkenes may differ between regions, each region comprising a gas sensor system according to the present invention and a source of 1-MCP. For example, a warehouse may comprise a plurality of regions.

In other embodiments, a FET according to the third aspect may be used as a gas sensor, alone or as part of a gas sensor system. The FET according to the third aspect may be used to detect ethylene or 1-MCP, and different responses to these gases may be used to differentiate between these gases. For example, an irreversible response may indicate the presence of 1-MCP, alone or with another alkene, whereas a reversible response may indicate that an alkene other than 1-MCP, for example ethylene, is present.

Use of the device has been described herein with reference to 1-MCP and ethylene, however it will be appreciated that the device of the invention may be used in detection of strained alkenes generally, optionally compounds comprising a cyclopropene or cyclobutene group, of which 1-MCP is an example, and/or in detection of aliphatic alkenes, optionally ethylene, propene, 1-butene or 2-butene.

The semiconductor layer of the thin film transistors described herein may comprise or consist of any semiconducting material including, without limitation, silicon, a conjugated organic semiconducting material, graphene or carbon nanotubes. Organic semiconductors include polymers and non-polymeric compounds. The semiconductor layer may comprise a blend of a non-polymeric organic semiconductor and a polymer. Exemplary organic semiconductors are disclosed in WO 2016/001095, the contents of which are incorporated herein by reference. Preferably, the semiconducting layer comprises at least one organic semiconducting material and the TFT is an organic TFT. An organic semiconducting layer is particularly preferred in the case of a bottom-contact TFT to allow permeation of the alkenes through the semiconductor layer to the source and drain electrodes.

An organic semiconducting layer may be deposited by any suitable technique, including evaporation and deposition from a solution comprising or consisting of one or more organic semiconducting materials and at least one solvent. Exemplary solvents include mono- or poly-alkylbenzenes such as toluene and xylene; tetralin; and chloroform. Solution deposition techniques include coating and printing methods, for example spin coating dip-coating, ink jet printing, roll printing and screen printing.

The gold layers 107B, 109B comprise or consist of elemental gold. Preferably, the gold layers consist of elemental gold.

Optionally, the gold layers 107B, 109B have a thickness in the range of about 10-100 nm.

The oxide layers 107A, 109A comprise or consist of at least one oxide. Preferably, the oxide layers comprise or consist of a transition metal oxide, more preferably molybdenum, tungsten or vanadium oxide, most preferably molybdenum oxide.

Optionally, the oxide layers 107A, 109A have a thickness in the range of about 0.5-20 nm, preferably about 1-10 nm.

The length of the channel defined between the source and drain electrodes may be up to 500 microns, but preferably the length is less than 200 microns, more preferably less than 100 microns.

The gate electrode can be selected from a wide range of conducting materials for example a metal (e.g. aluminium), a conductive metal compound (e.g. indium tin oxide), or a conductive polymer.

The dielectric layer comprises a dielectric material. Preferably, the dielectric constant, k, of the dielectric material is at least 2 or at least 3. The dielectric material may be organic, inorganic or a mixture thereof. Preferred inorganic materials include $SiO_2$, SiNx and spin-on-glass (SOG). Preferred organic materials are polymers and include insulating polymers such as poly vinylalcohol (PVA), polyvinylpyrrolidine (PVP), acrylates such as polymethylmethacrylate (PMMA) and benzocyclobutanes (BCBs). The polymer may be crosslinkable. The insulating layer may be formed from a blend of materials or comprise a multi-layered structure. In the case of a bottom-gate device, the gate electrode may be reacted, for example oxidised, to form a dielectric material.

The dielectric material may be deposited by thermal evaporation, vacuum processing or lamination techniques as are known in the art. Alternatively, the dielectric material may be deposited from solution using, for example, spin coating or ink jet printing techniques and other solution deposition techniques discussed above. If the dielectric material is deposited from solution then the dielectric material should not be dissolved if an organic semiconductor is deposited onto it from solution. Techniques to avoid such dissolution include: use of orthogonal solvents for example use of a solvent for deposition of the organic semiconducting layer that does not dissolve the dielectric layer; and cross linking of the dielectric layer before deposition of the organic semiconductor layer. The thickness of the insulating layer is preferably less than 2 micrometres, more preferably less than 500 nm.

The substrate of a bottom contact TFT as described herein may be any insulating substrate, optionally glass or plastic. The first and second FETs of a gas sensor system as described herein may be manufactured on a common substrate.

Optionally, the first and second FETs of the gas sensor differ only in their source and drain electrodes. The manufacture of the first and second FETs may differ only in the deposition of the source and drain electrodes.

Figure 4:
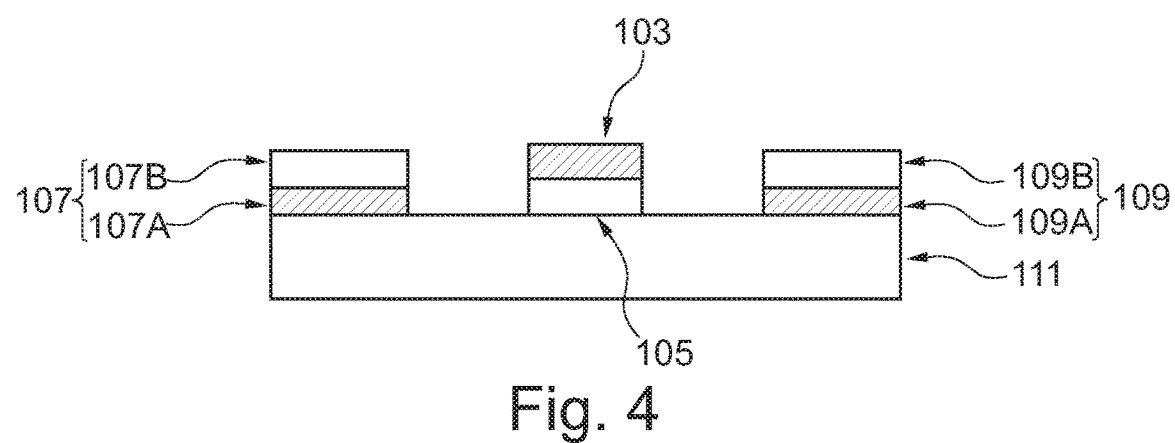
FIG. 4 illustrates an FET for use as a gas sensor according to embodiments of the invention.

The transistors of the present invention are preferably bottom gate thin-film transistors, for example as described with reference to FIGS. 2 and 3, however in other embodiments an FET as described herein may be another form of field effect transistor, for example as illustrated in FIG. 4 in which source, drain and gate electrodes and the insulating layer are formed on an n-type or p-type silicon layer. The transistor may be a MOSFET.

EXAMPLES

General Device Process

On a PEN substrate carrying an aluminium gate electrode was formed a crosslinked dielectric layer by spin-coating and crosslinking an insulating polymer to a thickness of about 300 nm. Source and drain electrodes were formed by thermal evaporation of materials as set out in Table 1 to form single layer or bilayer source and drain electrodes. Semiconducting Polymer 1 was formed over the dielectric layer and source and drain electrodes by spin-coating to a thickness of 40 nm to form bottom contact, bottom electrode TFT Device Example 1.

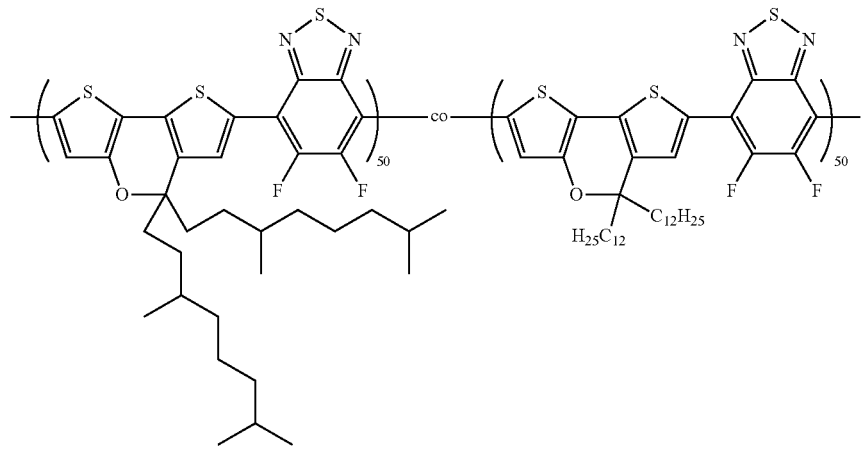

Semiconducting Polymer 1

TABLE 1

| Device | Source and drain electrodes |
| --- | --- |
| Device Example 1 | $MoO_3$ (5 nm)/Au (40 nm) |
| Comparative Device 1 | $MoO_3$ (5 nm)/Ag (40 nm) |
| Comparative Device 2 | Au (40 nm) |

The response of the devices to ethylene gas or 1-MCP gas exposure was measured by monitoring the level of the drain current as a function of time. The transistor device was driven at a constant finite voltage of $Vg=Vds=-4V$.

Device Example 1

Figure 5A:
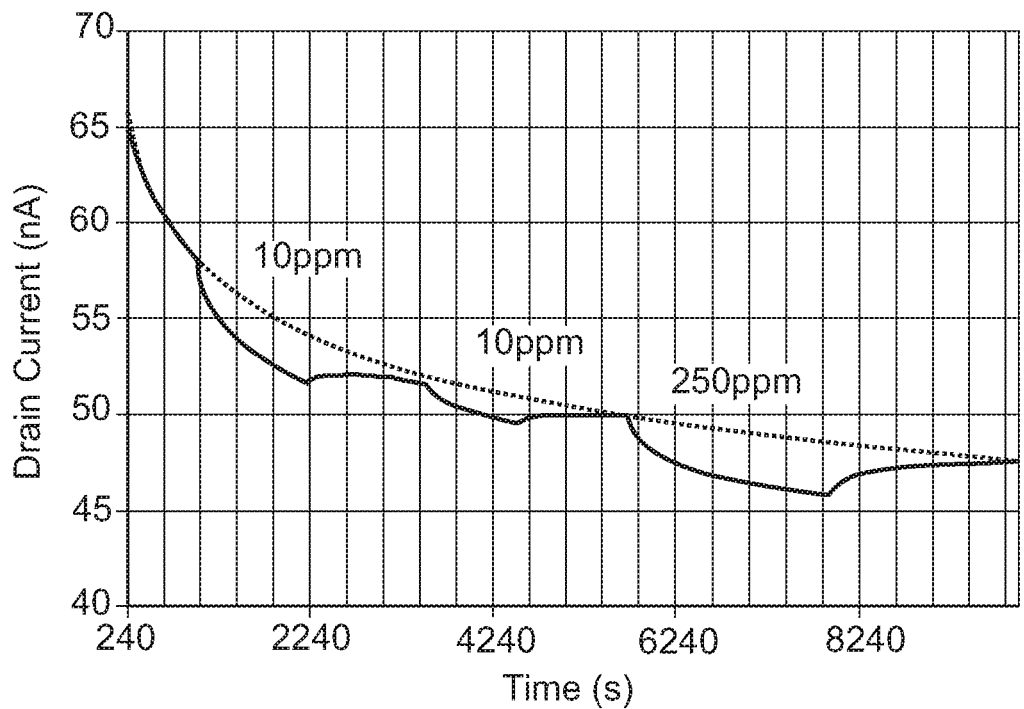
FIG. 5A is a graph of drain current vs. time for a bottom gate OTFT according to an embodiment of the invention in which the OTFT is exposed alternately to ethylene and dry nitrogen.

With reference to FIG. 5A, the dotted line is a baseline drain current of Device Example 1 in a dry nitrogen environment. The drain current falls over time due to deterioration of the device over time.

Device Example 1 was exposed to 10 ppm ethylene for 10 minutes followed by a recovery time in dry nitrogen of 10 minutes. The device was then exposed to 250 ppm ethylene for 40 minutes with a 35 minute recovery time in dry nitrogen.

The solid line shows a fall in drain current occurs upon exposure to ethylene, the fall being greater at higher concentrations. The drain current returns to at or about the baseline level in a dry nitrogen environment.

Figure 5B:
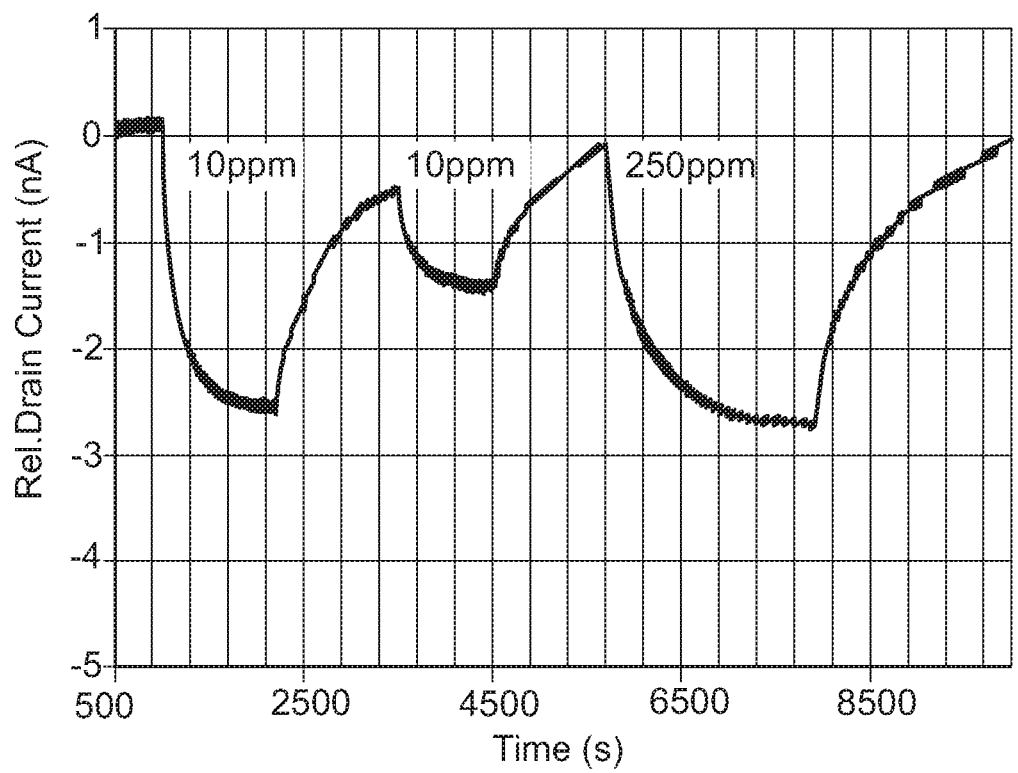
FIG. 5B is the graph of FIG. 5A relative to a baseline.

This is also shown in FIG. 5B which shows the drain current of FIG. 5A relative to the changing baseline.

Figure 6A:
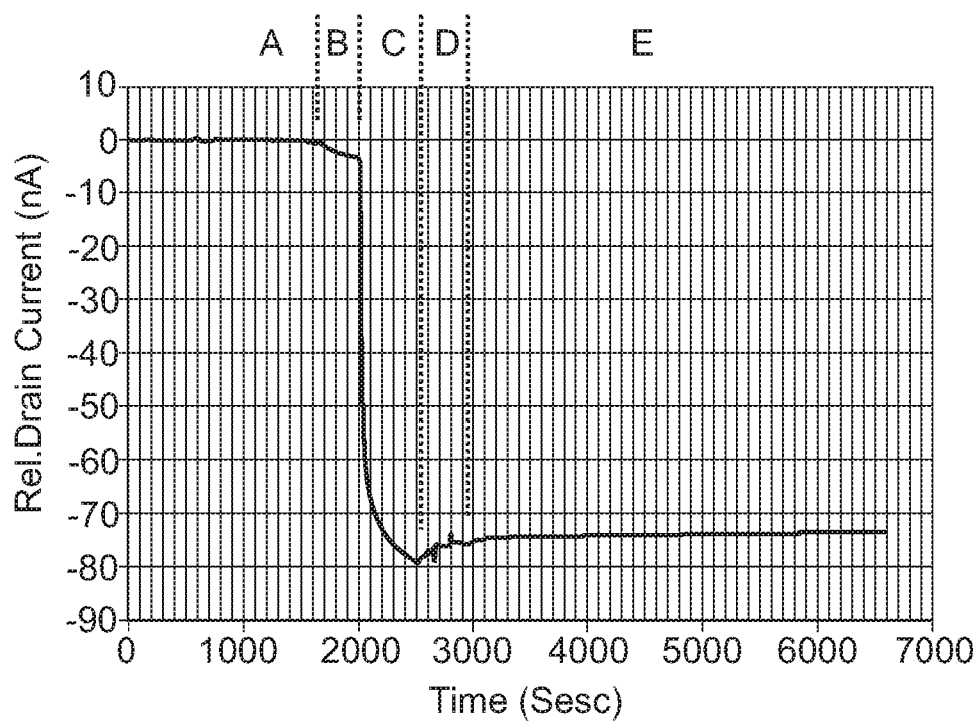
FIG. 6A is a graph of drain current vs. time for a bottom gate OTFT according to an embodiment of the invention in which the OTFT is exposed to 100 ppm of 1-MCP, air and dry nitrogen.

With reference to FIG. 6A, Device Example 1 was exposed to: air during time period A; air having a high relative humidity during time period B; 100 ppm of 1-MCP under relatively high humidity during time period C; air during time period D; and dry nitrogen during time period E. As shown in FIG. 6A, exposure to 1-MCP during time period C resulted in a sharp fall in drain current. In contrast to exposure to ethylene, no significant recovery of drain current was observed when the device was returned to an air or a dry nitrogen environment.

Figure 6B:
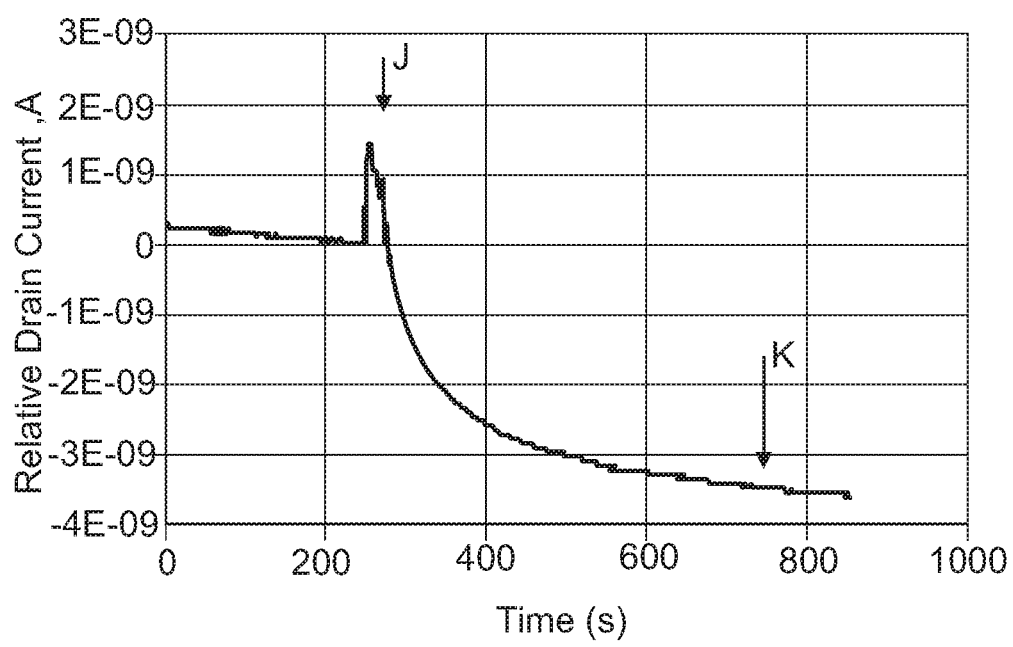
FIG. 6B is a graph of drain current vs. time for a bottom gate OTFT according to an embodiment of the invention in which the OTFT is exposed to 1 ppm of 1-MCP and air.

With reference to FIG. 6B, Device Example 1 was exposed to 1 ppm of 1-MCP at time point J. A sharp fall in drain current was observed and no recovery of drain current was observed upon a change of environment to air at time point K.

Comparative Device 1

Comparative Device 1 was exposed to 10 ppm and 25 ppm ethylene for 10 minutes followed by 10 minutes recovery in dry nitrogen. Exposure time to 250 ppm ethylene was 20 minutes with a 25 minute recovery time in dry nitrogen.

Figure 7A:
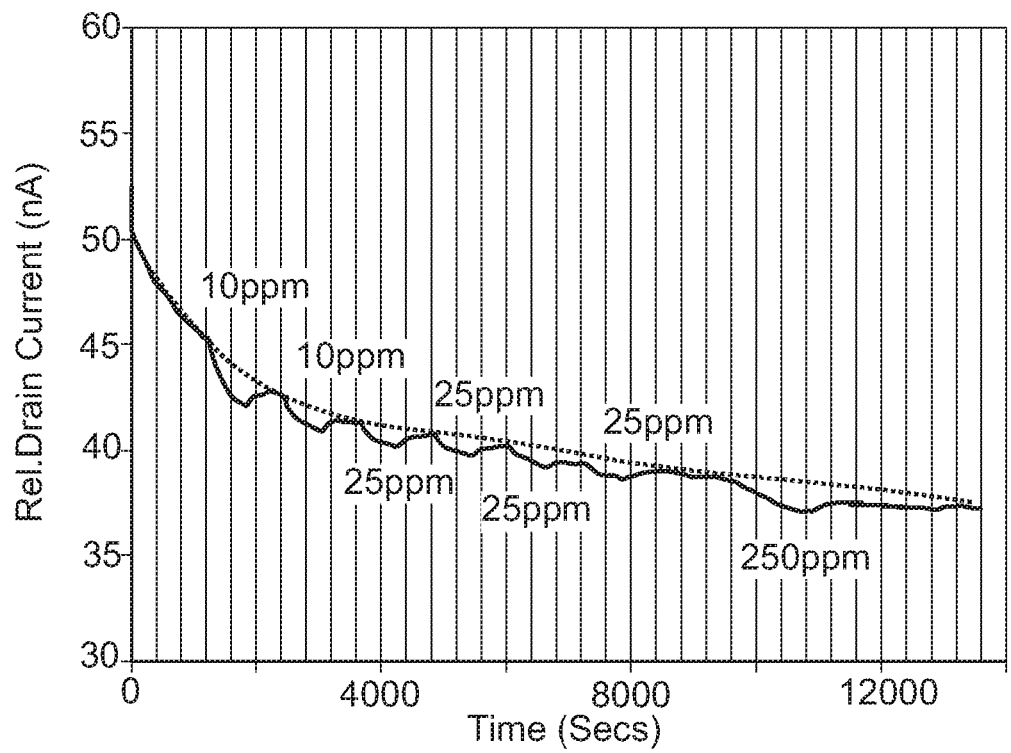
FIG. 7A is a graph of drain current vs. time for a comparative bottom gate OTFT having source and drain electrodes of MoO3/Ag in which the OTFT is exposed alternately to ethylene and dry nitrogen.
Figure 7B:
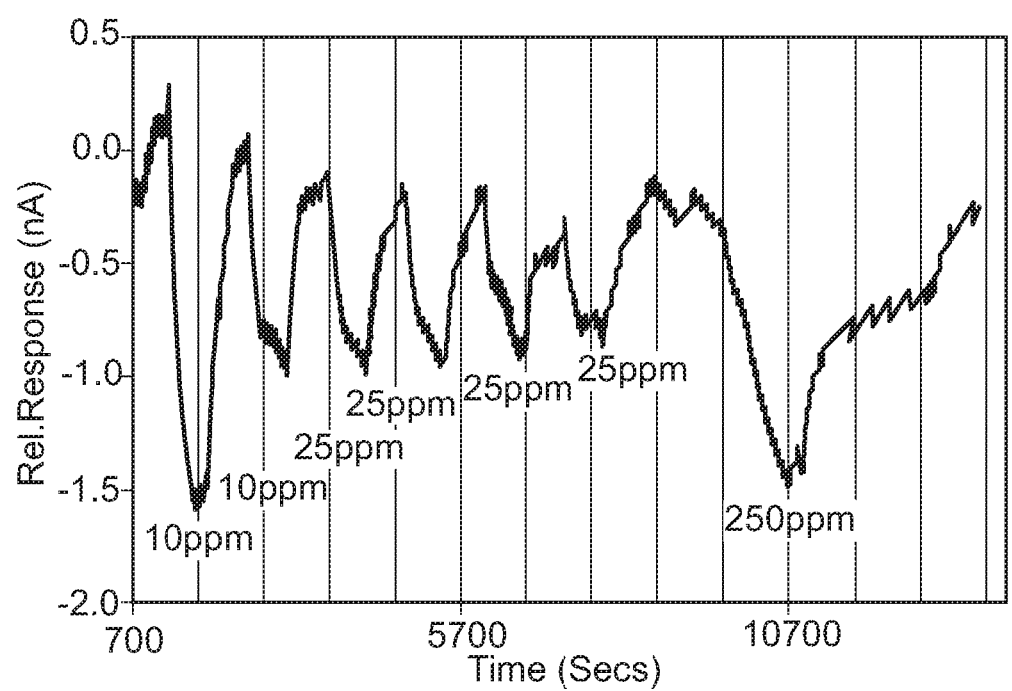
FIG. 7B is the graph of FIG. 6A relative to a baseline.

With reference to FIGS. 7A and 7B, drain current returns to, or very close to, its baseline value after exposure to ethylene.

Figure 8A:
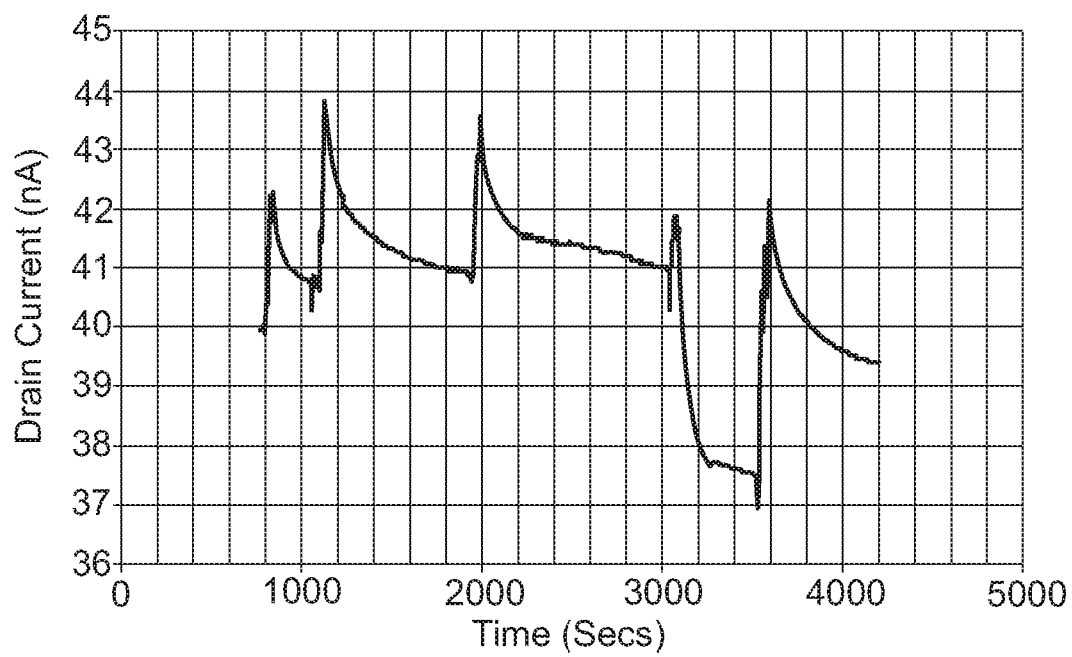
FIG. 8A is a graph of drain current vs. time for a comparative bottom gate OTFT having source and drain electrodes of MoO3/Ag in which the OTFT is exposed to air, dry nitrogen and 1-MCP.
Figure 8B:
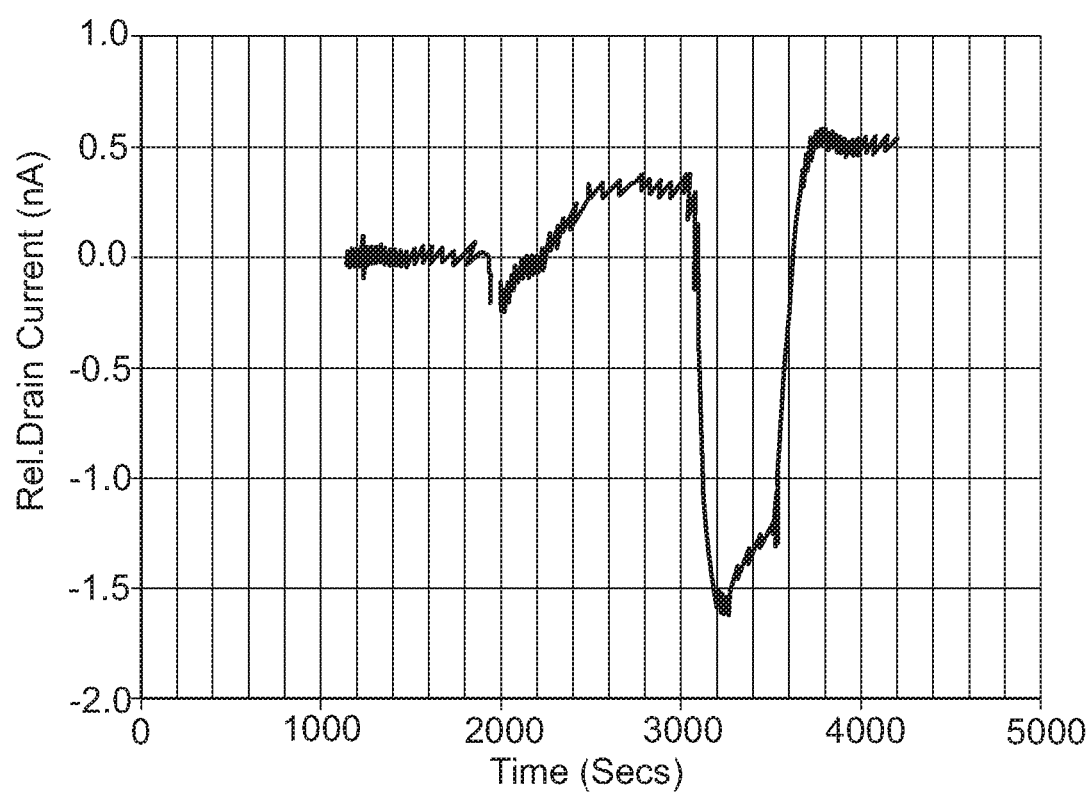
FIG. 8B is the graph of FIG. 7A relative to a baseline and in which responses to room air have been subtracted.

Comparative Device 1 was exposed to 10 ppm and 500 ppm 1-MCP. With reference to FIGS. 8A and 8B, and in contrast to Device Example 1, drain current returns to close to a baseline value after exposure to 1-MCP.

Comparative Device 2

Figure 9:
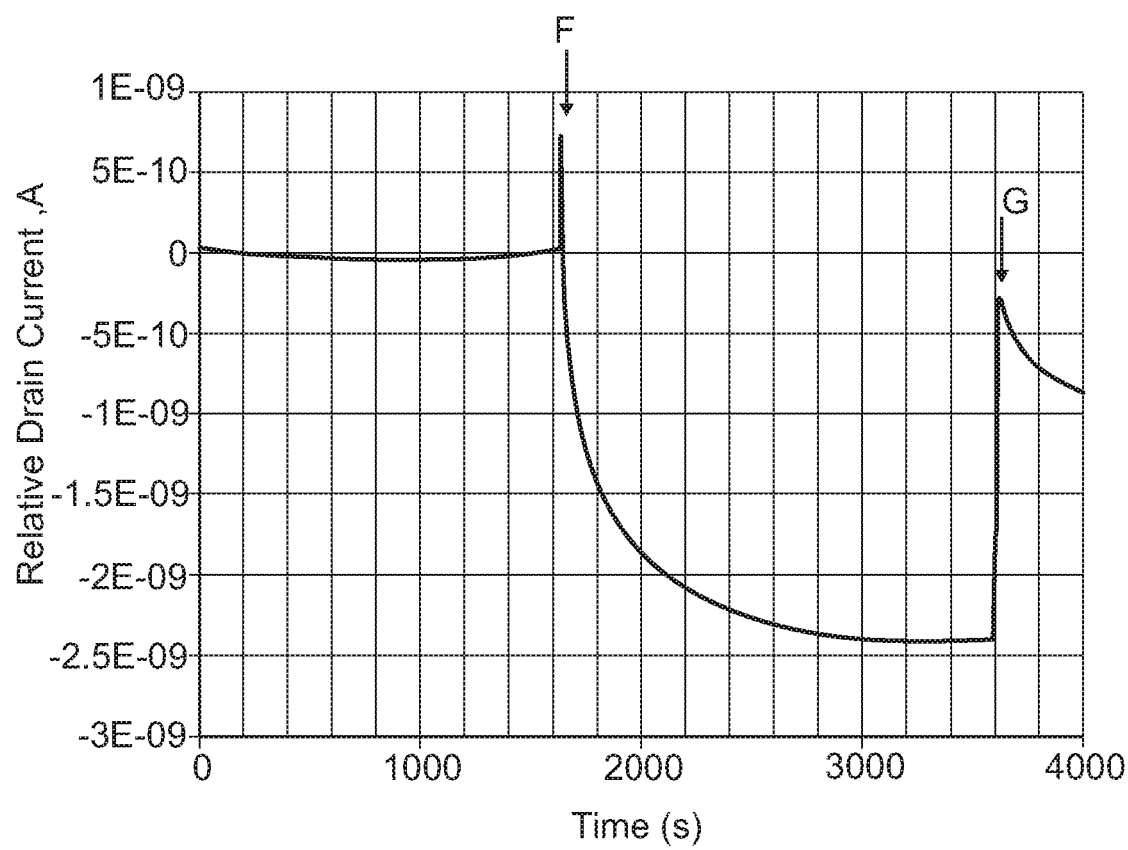
FIG. 9 is a graph of drain current vs. time for a comparative bottom gate OTFT having source and drain electrodes of Au in which the OTFT is exposed to air and 1 ppm of 1-MCP.

With reference to FIG. 9, Comparative Device 2 was exposed to 1 ppm of 1-MCP at time point F, resulting in a fall in drain current. The device was then exposed to air at time point G which, resulted in the drain current returning to close to its starting value, unlike the response of Device Example 1 upon exposure to 1 ppm of 1-MCP followed by exposure to air as described with reference to FIG. 6B.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A gas sensor system comprising at least one first field effect transistor comprising first source and drain electrodes and at least one second field effect transistor comprising second source and drain electrodes different from the first source and drain electrodes, wherein the first source and drain electrodes differ from the second source and drain electrodes in at least one of: number of layers of the source and drain and electrodes; and material composition of a layer of the source and drain electrodes.

2. A gas sensor system according to claim 1 wherein the first source and drain electrodes comprise a bilayer.

3. A gas sensor system according to claim 2 wherein the first field effect transistor comprises a gate electrode; source and drain electrodes; a semiconductor layer extending between the source and drain electrodes; and a dielectric layer between the gate electrode and the semiconductor layer, wherein the source and drain electrodes each comprise a first layer comprising gold and a second layer comprising an oxide between the first layer and the dielectric layer.

4. A gas sensor system according to claim 3 wherein the source and drain electrodes consist of the first gold layer and the second oxide layer.

5. A gas sensor system according to claim 3 wherein the oxide layer comprises molybdenum trioxide.

6. A gas sensor system according to claim 3 wherein the oxide layer has a thickness of 0.5-20 nm.

7. A gas sensor system according to claim 1 wherein the second source and drain electrodes are selected from: a single metal layer and a bilayer comprising a first layer comprising a metal other than gold and a second layer comprising an oxide between the first layer and a dielectric layer.

8. A gas sensor system according to claim 1 wherein the first field effect transistor and/or the second field effect transistor is a bottom-gate thin film transistor.

9. A gas sensor system according to claim 3 wherein the semiconductor layer of the first field effect transistor comprises an organic semiconductor.

10. A gas sensor system according to claim 1 wherein a response of the first field effect transistor differs from a response of the second field effect transistor in the presence of 1-methylcyclopropene.

11. A gas sensor system according to claim 10 wherein the response of the first field effect transistor differs from the response of the second field effect transistor in at least one of: amount of change in drain current; rate of change in drain current; and reversibility of change in drain current.

12. A method of identifying the presence and/or concentration of at least one target gas in an environment, the method comprising the step of measuring a parameter of each of the first and second field effect transistors of the gas sensor system according to claim 1 in the environment and determining from the measured parameters if the at least one target gas is present and/or determining a concentration of the at least one target gas.

13. A method according to claim 12 wherein the target gas is an alkene.

14. A method according to claim 12 wherein a target gas concentration is determined for each target gas determined to be present in the environment.

15. A method according to claim 14 wherein the target gas is at least one alkene.

16. A method according to claim 15 wherein the at least one alkene is ethylene and/or 1-methylcyclopropene.

17. A method according to claim 16 wherein 1-methylcyclopropene is released into the environment from a 1-methylcyclopropene source in response to detection of ethylene above a threshold concentration and/or in response to detection of 1-methylcyclopropene below a threshold concentration.

* * * * *

UNITED STATES PATENT AND TRADEMARK OFFICE
CERTIFICATE OF CORRECTION

| | | |
|---|---|---|
| PATENT NO. | : 11,415,545 B2 | Page 1 of 1 |
| APPLICATION NO. | : 16/603453 | |
| DATED | : August 16, 2022 | |
| INVENTOR(S) | : Christopher Newsome et al. | |

It is certified that error appears in the above-identified patent and that said Letters Patent is hereby corrected as shown below:

On the Title Page

Item (30), Foreign Application Priority Data, please replace:
"Apr. 7, 2017   (GB) ..................... 1705676"
With:
-- Apr. 7, 2017   (GB) ..................... 1705676.3 --

Signed and Sealed this
Eighteenth Day of October, 2022

Katherine Kelly Vidal
*Director of the United States Patent and Trademark Office*